United States Patent [19]
Yen-Chen et al.

[11] Patent Number: 5,298,918
[45] Date of Patent: Mar. 29, 1994

[54] ELECTRIC CIRCUIT FOR REDUCING THE ENERGY CONSUMPTION OF A POINTING DEVICE USED IN COMBINATION WITH A DATA PROCESSING SYSTEM

[76] Inventors: Chiu Yen-Chen, No. 73. LN 15, Hoping Street, Hsinpu, Hasinchu; Chang Chi-Chun, No. 1, R&D 4th Rd., Science-Based Industrial Park, Hasinchu; Hwang Jyn-Guo; Wu Yu-Kun, both of No. 1, R&D 4th Rd., Science-Based Industrial Park, Hasinchu City; Tai Jui-Chiang, No. 60, LN 635, Hwa-Shin St., Chupei City, Hasinchu, all of Taiwan

[21] Appl. No.: 792,020

[22] Filed: Nov. 13, 1991

Related U.S. Application Data

[63] Continuation-in-part of Ser. No. 561,544, Aug. 1, 1990, abandoned.

[51] Int. Cl.$^5$ .............................................. G09G 5/00
[52] U.S. Cl. .................................... 345/163; 345/164; 345/166
[58] Field of Search ...................... 340/706, 709, 710

[56] References Cited

U.S. PATENT DOCUMENTS

| | | | |
|---|---|---|---|
| 4,886,941 | 12/1989 | Davis et al. | 178/18 |
| 4,959,805 | 9/1990 | Ohouchi et al. | 340/706 X |
| 5,027,109 | 6/1991 | Donovan et al. | 340/706 |
| 5,153,571 | 10/1992 | Takahashi | 340/706 X |

Primary Examiner—Jeffery Brier
Attorney, Agent, or Firm—Thomas R. Morrison

[57] ABSTRACT

An electric circuit is to be incorporated in a pointing device (such as a computer mouse) which is used in combination with a data processing system (such as a computer) so as to reduce the energy consumption of the pointing device without affecting the original functions and efficiency thereof and thus permit the pointing device to fit into a system wherein electric consumption is of vital importance. The electric circuit includes a timing control circuit and a noise-suppressing sampling circuit which controls the operation of the energy consuming elements of the pointing device according to the movement of the pointing device. The noise-suppressing circuit can distinguish movement signals from noise signals, thus suppressing the interference due to noise and further reducing the energy consumed by the pointing device.

7 Claims, 5 Drawing Sheets

ELECTRIC CIRCUIT FOR REDUCING THE ENERGY CONSUMPTION OF A POINTING DEVICE USED IN COMBINATION WITH A DATA PROCESSING SYSTEM

This is a continuation-in-part of U.S. patent application Ser. No. 07/561,544 filed on Aug. 1, 1990, now abandoned.

BACKGROUND OF THE INVENTION

1. Field of the Invention

The invention relates to a pointing device which is generally used to generate coordinates of position, more particularly to an electric circuit which is to be incorporated in a pointing device so as to reduce the energy consumption of the pointing device.

2. Description of the Related Art

A pointing device, such as a computer mouse, is used in combination with a data processing system, such as a computer, and is a useful and handy tool in determining and in generating coordinates of position so as to move a cursor on a computer display screen. The computer mouse generally comprises a movable part, a movement sensor means to detect the movement of the movable part on a flat surface and a plurality of function keys. The computer mouse can encode the status of the function keys and the relative position and movement thereof on an X-Y plane and send the resulting codes to the computer via a communication port, such as an RS-232C interface. The computer then moves the cursor and performs different operations in accordance with the received codes.

The movement sensor means is used to determine the velocity of the movable part, including its speed and direction. The movement sensor means is generally categorized into two groupings, mechanical and optical. In the mechanical movement sensor, the rolling movement of a tracking ball on a flat surface actuates a grid and thus intermittently turns on and off a photocoupler. The resulting analog signal is then amplified and conditioned so as to become a digital signal. In the optical movement sensor, optical elements are provided so as to emit light signals which, after being reflected by a grid pad, will be received and encoded by a rotary encoder so as to be obtain electric signals.

The photoelectric elements and analog amplifying and conditioning circuits which are used in the above-mentioned movement sensors consume a great amount of energy. This is very uneconomical, especially for a computer mouse which is connected to an RS-232C interface, for a cordless mouse or for a computer mouse of a lap-top computer.

Furthermore, in a conventional computer mouse, the grid receives a great number of noise signals when it is partially closed. These noise signals are often mistaken for movement signals by the computer mouse, and frequent, untimely movement of the cursor on the computer display screen therefore occurs. The frequent unwanted movement of the cursor also results in greater energy consumption.

SUMMARY OF THE INVENTION

Therefore, the main objective of the present invention is to provide an electric circuit which is to be incorporated in a pointing device so as to reduce the energy consumption of the pointing device.

More specifically, the objective of the present invention is to provide an electric circuit which utilizes timing pulses so as to control the operation of energy consuming elements in the pointing device and thereby reduce the energy consumption of the same.

Another objective of the present invention is to provide an electric circuit which utilizes a timing control circuit and a noise-suppressing sampling circuit to monitor the movement of a computer mouse and to control the operating frequency of the energy consuming elements so as to correspond with the speed of the computer mouse.

The timing control circuit generates pulse signals of different frequencies in accordance with the frequency of the sampled movement signal from the movement sensor means of the computer mouse. The pulse signals actuate a switch gate so as to connect the energy consuming elements intermittently to an electric power source.

The noise-suppressing sampling circuit will sample the movement signals provided by the movement sensor means and distinguish noise signals from movement signals. The noise-suppressing sampling circuit then analyzes the direction of movement of the computer mouse and provides information to the timing control circuit so as to permit the latter to track the velocity of the computer mouse. The noise-suppressing sampling circuit also provides the movement information to up-down counters so as to determine the displacement and direction of the mouse movement.

Accordingly, the preferred embodiment of an electric circuit of the present invention is to be incorporated in a pointing device (such as a computer mouse) that is used in combination with a data processing system (such as a computer) so as to reduce the energy consumption of the pointing device without affecting its original functions and efficiency, thereby enabling the pointing device to fit into a system wherein energy consumption is of vital importance.

The electric circuit comprises a timing control circuit and a noise-suppressing sampling circuit which controls the operation of the movement sensor means of the pointing device according to the movement of the computer mouse. The noise-suppressing sampling circuit serves to sample and distinguish movement signals from noise signals, thus suppressing the interference due to noise and further reducing the energy consumed by the pointing device.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
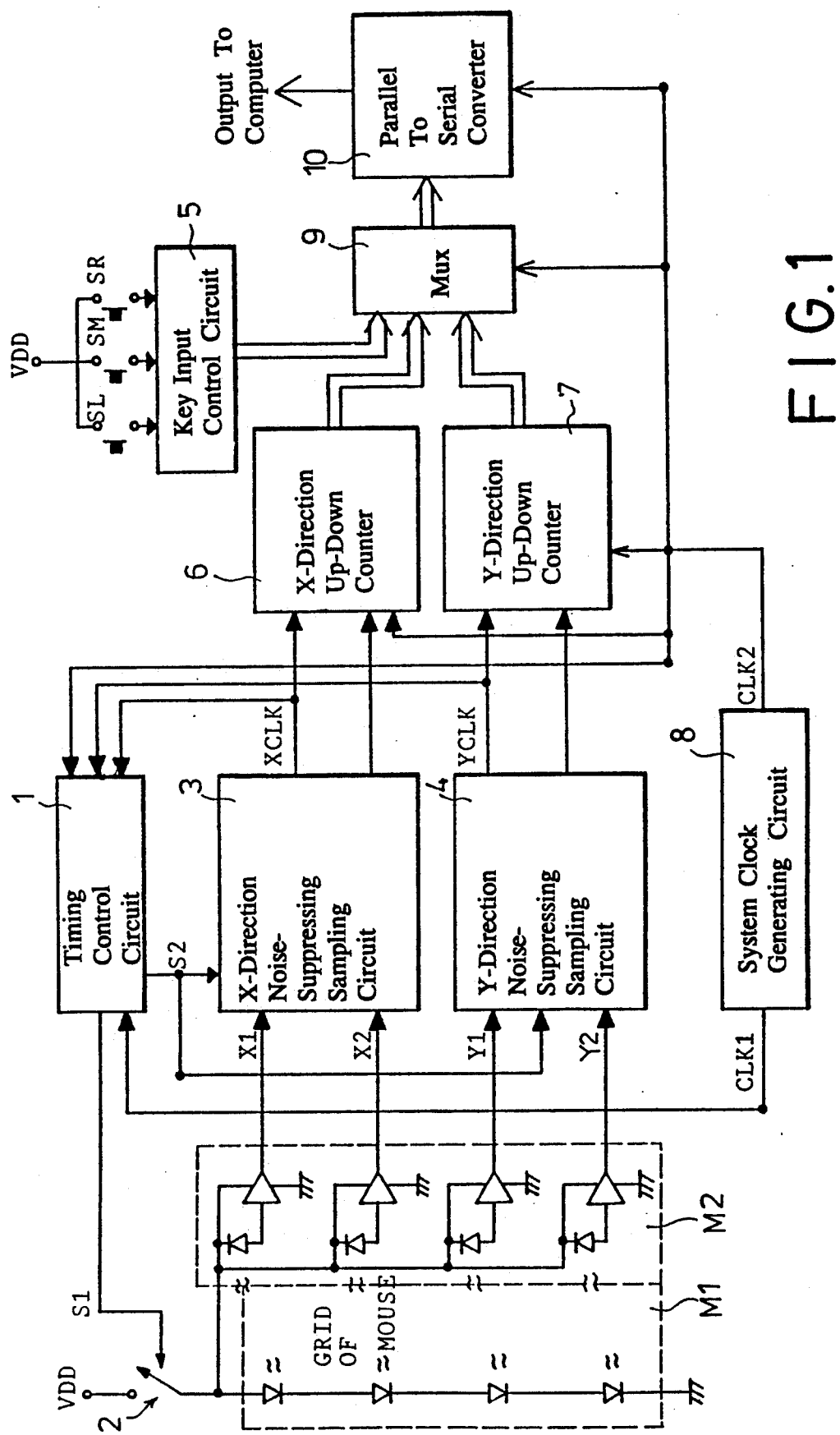
FIG. 1 is a schematic block diagram of the present invention.

Referring to FIG. 1, the preferred embodiment of an electric circuit according to the present invention is shown to comprise a timing control circuit (1), a switch gate (2), an X-direction noise-suppressing sampling circuit (3), a Y-direction noise-suppressing sampling circuit (4), a key input control circuit (5), an X-direction up-down counter (6), a Y-direction up-down counter (7), a system clock generating circuit (8), a multiplexer (9) and a parallel-to-serial converter (10).

Figure 2:
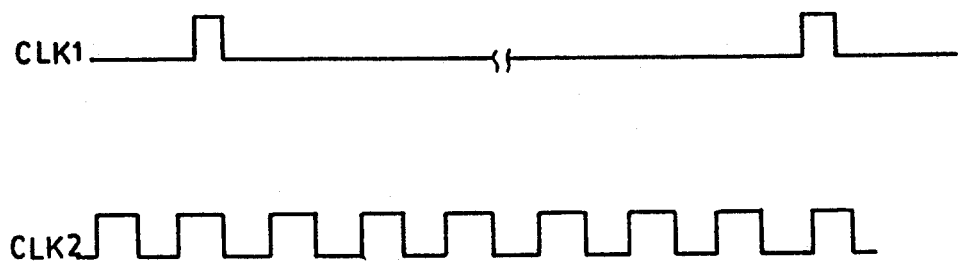
FIG. 2 is a timing diagram of a pair of clock signals (CLK1, CLK2) produced by a system clock generating circuit of the preferred embodiment.

The system clock generating circuit (8) generates two clock signals (CLK1, CLK2), as shown in FIG. 2. The frequency of the clock signal (CLK1) is 256 Hz and is provided to the timing control circuit (1) to serve as the operating frequency for detecting the displacement signals generated by the X- and Y-direction noise-suppressing sampling circuits (3, 4). The frequency of the clock signal (CLK2) is 32,768 Hz and is similarly provided to the timing control circuit (1) so as to control the actuation of the switch gate (2). The clock signal (CLK2) also serves as the system operating clock. The inputs of the key input control circuit (5) are connected to a plurality of function keys (SL, SM, SR). The output of the key input control circuit (5) and the displacement signals generated by the X- and Y-direction noise-suppressing sampling circuits (3, 4) are sent to the multiplexer (9). The output of the multiplexer (9) is converted into a serial bit stream by the parallel-to-serial converter (10) for reception by a data processing system such as a computer (not shown).

The timing control circuit (1) provides two output signals (S1, S2). The output signal (S1) is used to control the switch gate (2) while the output signal (S2) is received by the X- and Y-direction noise-suppressing sampling circuits (3, 4) and is used to control the sampling of the movement signals from the movement sensor means of the computer mouse.

Figure 3:
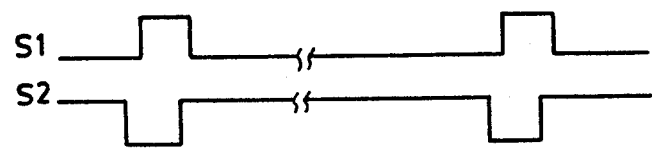
FIG. 3 is a timing diagram of a pair of output signals (S1, S2) generated by a timing control circuit of the preferred embodiment.

The movement sensor means includes a grid means (M1) and a plurality of analog amplifying and conditioning circuits (M2). In order to actuate the grid means (M1) and the analog amplifying and conditioning circuits (M2) in a timely fashion, the sampling action, as controlled by the output signal (S2), should be done at the end of the output signal (S1). The timing diagrams of the output signals (S1, S2) are shown in FIG. 3.

Referring once more to FIG. 1, when the switch gate (2) is closed, the movement of the computer mouse is detected by photoelectric elements and is sent out via the grid means (M1). Signals from the grid means (M1) are received by the analog amplifying and conditioning circuits (M2). The analog amplifying and conditioning circuits (M2) include four operational amplifiers and a diode connected to each of the operational amplifiers. Two of the operational amplifiers generate output signals (X1, X2), which output signals have a phase difference of 90. The output signals (X1, X2) correspond to the movement in X-direction and are sent to the X-direction noise-suppressing sampling circuit (3). The remaining two of the operational amplifiers generate output signals (Y1, Y2), which output signals similarly have a phase difference of 90°. The output signals (Y1, Y2) correspond to the movement in Y-direction and are sent to the Y-direction noise-suppressing sampling circuit (4).

The output signals of the noise-suppressing sampling circuits (3, 4) correspond to the displacement and the direction of the movement of the computer mouse in both the X- and Y-directions. The displacement signals are herein referred to as the XCLK (X-direction movement) and the YCLK signals (Y-direction movement). The displacement signals (XCLK, YCLK) are then sent to the X- and Y-direction up-down counters (6, 7) to calculate the displacement in both the X- and Y-directions. The outputs of the up-down counters (6, 7) are then received and encoded by the multiplexer (9). The output of the multiplexer (9) is converted into a serial bit stream by the parallel-to-serial converter (10) for transmission to a computer (not shown) via a communication port (not shown).

Figure 4A:
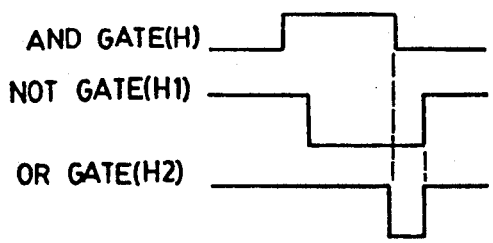
FIG. 4A is a timing diagram of a Flip-Flop reset circuit of the noise-suppressing sampling circuit shown in FIG. 4.
Figure 4:
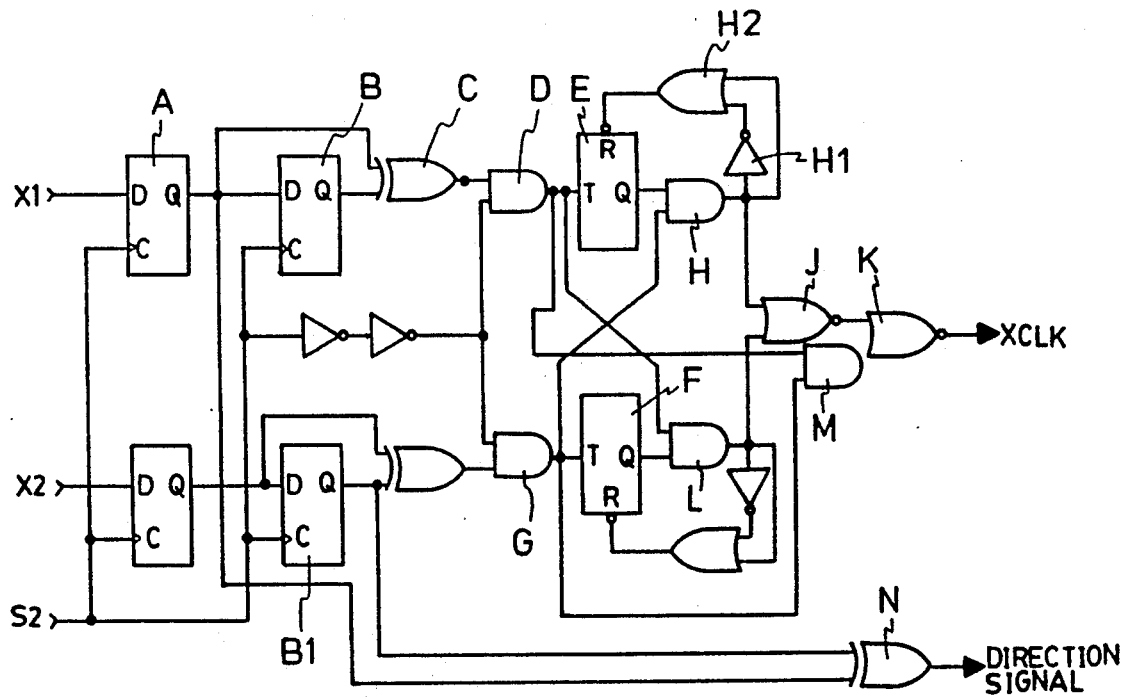
FIG. 4 is an electrical circuit diagram of a noise-suppressing sampling circuit of the preferred embodiment.

A schematic electrical circuit diagram of the noise-suppressing sampling circuit is shown in FIG. 4. Since both the X- and Y-direction noise-suppressing sampling circuits (3, 4) are identical in construction, only one of the sampling circuits (the X-direction noise-suppressing sampling circuit) will be detailed herein.

The status of the output signals (X1, X2) are sampled in accordance with the output signal (S2) of the timing control circuit (1). The output signal (X1) travels through two D-type Flip-Flops (A, B). Each time the status of the output signal (X1) changes, an exclusive OR gate (C), which is connected to the Flip-Flop (B), generates a pulse signal of the same width as the output signal (S2). The output of the exclusive OR gate (C) is sent to an AND gate (D), together with the delayed (S2) signal, to thereby generate a pulse that has a width of approximately 15 microseconds. The output signal (X2) is processed in the same manner, and an AND gate (G) will also generate a 15 microseconds positive pulse.

Elements (E) and (F) are two T-type Flip-Flops. When a positive pulse is generated by the AND gate (D), Flip-Flop (E) will be set to "1," and if the AND gate (G) also generates a pulse thereafter, then Flip-Flop (F) will also be set to "1." An AND gate (H) will have a logic "1" output and an XCLK pulse signal will be generated through a pair of NOR gates (J, K). Referring to FIGS. 4 and 4A, the output of the AND gate (H) is fed to a NOT gate (H1). The output of the AND gate (H) and the output of the NOT gate (H1) are then coupled to the input terminals of an OR gate (H2). A negative pulse signal is generated at the output terminal of the OR gate (H2) at the rear edge of the pulse generated by the AND gate (H). The negative pulse signal is a result of the delay provided by the NOT gate (H1) and is used to clear the Flip-Flop (E). If the AND gate (D) outputs another pulse, then the Flip-Flop (E) will be set to "1," and another XCLK signal will be sent through AND gate (L) and the NOR gates (J, K). As with the Flip-Flop (E), the Flip-Flop (F) will be cleared at the rear edge of the pulse generated by the AND gate (L). It has thus been shown that an XCLK signal will be generated each time the output signals (X1, X2) are alternately generated.

If either of the AND gates (D, G) successively outputs two or more pulses [that is, pulses are not alternately generated by the AND gates (D, G)], the Flip-flops (E, F) will not toggle, and no XCLK pulse signal will be generated at the output of the NOR gate (K). If the AND gates (D, G) simultaneously output a pulse signal, then an AND gate (M) will output a logic "1" signal to inhibit the NOR gate (K) from generating the XCLK pulse signal. This illustrates the noise-suppressing features of the present invention.

The outputs of Flip-Flop (A, B1) are coupled to an exclusive OR gate (N). The output of the exclusive OR gate (N) represents the relationship between the output signals (X1, X2) (i.e., the direction of movement of the cursor).

Figure 5:
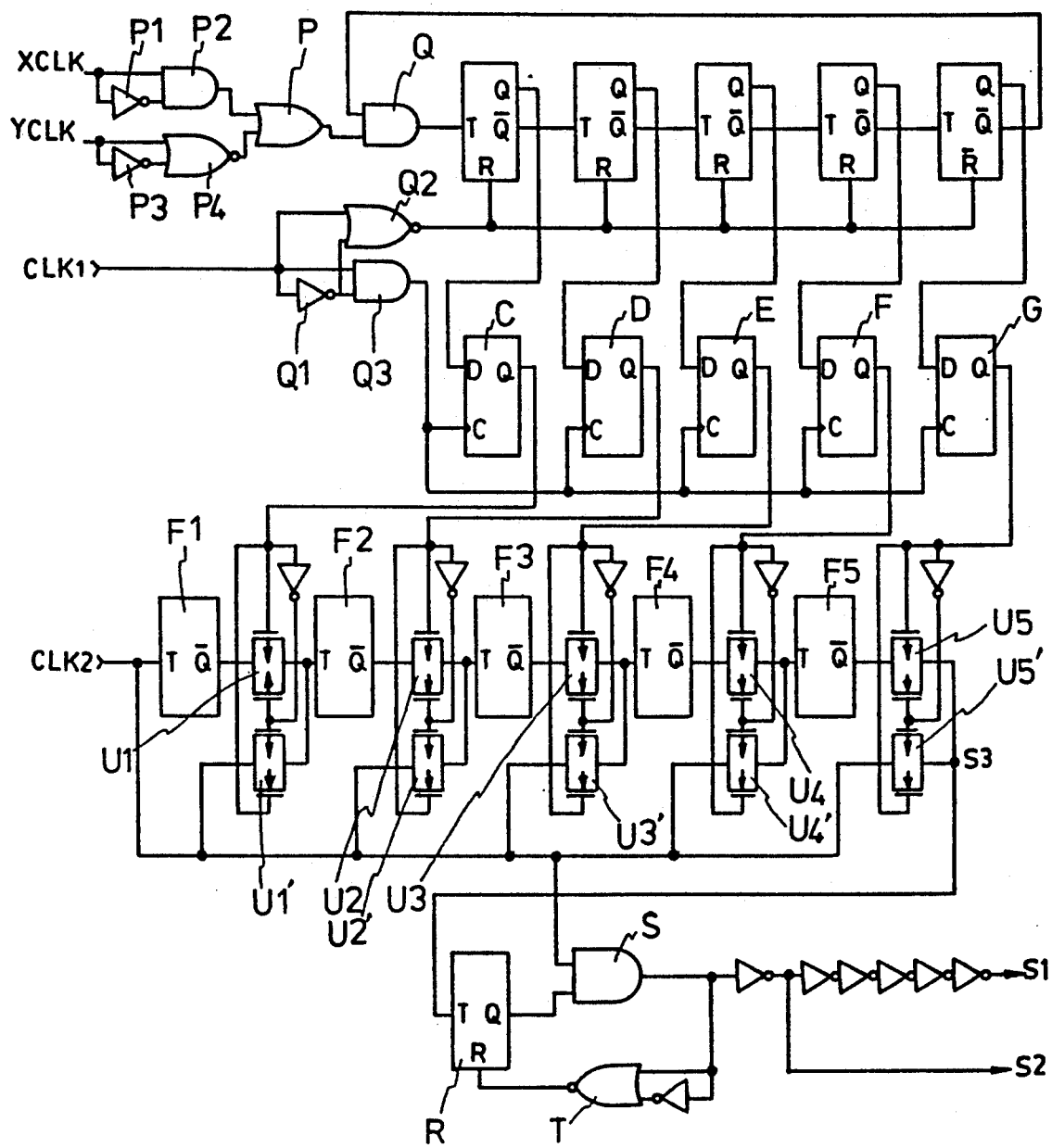
FIG. 5 is an electrical circuit diagram of the timing control circuit of the preferred embodiment.
Figure 5A:
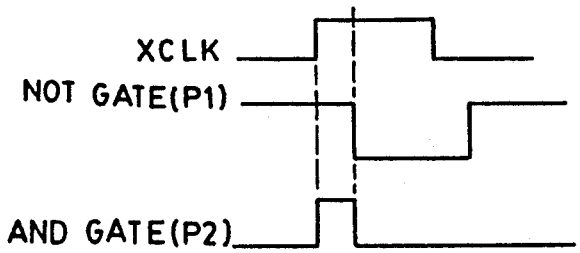
FIG. 5A is a timing diagram of an XCLK signal processing circuit of the timing control circuit shown in FIG. 5.

FIG. 5 is a schematic circuit diagram of the timing control circuit (1). The operation of the timing control circuit (1) is as follows:

1. Referring to FIGS. 5 and 5A, the XCLK signal is fed to a NOT gate (P1). The output of NOT gate (P1) and the XCLK signal are then coupled to the input terminals of an AND gate (P2). A positive pulse signal is generated at the output terminal of the AND gate (P2) at the front edge of the XCLK signal. The positive pulse signal is a result of the delay provided by the NOT gate (P1).

Figure 5B:
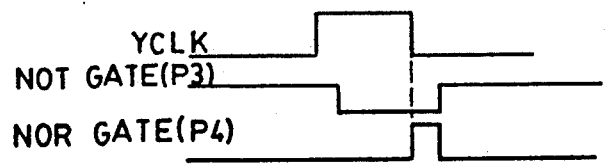
FIG. 5B is a timing diagram of a YCLK signal processing circuit of the timing control circuit shown in FIG. 5.

2. Referring to FIGS. 5 and 5B, the YCLK signal is fed to a NOT gate (P3). The output of NOT gate (P3) and the YCLK signal are then coupled to the input terminals of a NOR gate (P4). A positive pulse signal is generated at the output terminal of the NOR gate (P4) at the rear edge of the YCLK signal. The positive pulse signal is a result of the delay provided by the NOT gate (P3).

3. The outputs of the AND gate (P2) and NOR gate (P4) are fed to an OR gate (P). The output of the OR gate (P) is coupled to one of two input terminals of an AND gate (Q). The output of the AND gate (Q) is connected to the toggle input of a first stage of five cascaded stages of T-type Flip-Flops. The (/Q) output of a fifth stage of the T-type Flip-Flops is connected to the other input terminal of the AND gate (Q). When the accumulator constituted by the five cascaded Flip-Flops becomes saturated, the AND gate (Q) will become "closed" to prevent more XCLK and YCLK signals from entering the accumulator.

4. The clock signal (CLK1) is processed by a first circuit constituted by a NOT gate (Q1) and a NOR gate (Q2) so as to generate a pulse signal for clearing the accumulator at the rear edge of the clock signal (CLK1). (The operation of the first circuit is similar to that disclosed in step 2 and will not be detailed further). The clock signal (CLK1) is also processed by a second circuit constituted by the NOT gate (Q1) and by an AND gate (Q3) so as to generate a clock signal for a series of five D-type Flip-Flops (C, D, E, F, G). (The operation of the second circuit is similar to that disclosed in step 1 and will not be detailed further). The Flip-Flops (C-G) are triggered by the front edge of the clock signal (CLK1) so as to load the contents of the accumulator therein.

5. The division of the frequency of the clock signal (CLK2) is controlled by the five D-type Flip-Flops (C-G) and is as follows:

5.a. The outputs of the five D-Type Flip-Flops (C-G) serve as control inputs to ten CMOS transmission gates (U1-U5, U1'-U5'). The operation of the CMOS transmission gates are as follows: Referring to FIG. 5, the CMOS transmission gate (U1) has an upper control terminal connected to the output of Flip-Flop (C), a lower control terminal receiving the inverted output of Flip-Flop (C), an input terminal connected to the output of a T-type Flip-Flop (F1) and an output terminal connected to the input terminal of a T-type Flip-Flop (F2). When the output of Flip-Flop (C) is "0," the transmission gate (U1) is in a conducting state. The output of Flip-Flop (F1) is fed to the input terminal of Flip-Flop (F2). When the output of Flip-Flop (C) is a "1," the transmission gate (U1) is in a high impedance state. The operation of CMOS transmission gates (U2-U5) is substantially similar to that of CMOS transmission gate (U1) and will not be detailed further.

The CMOS transmission gate (U1') has a lower control terminal connected to the output of Flip-Flop (C), an upper control terminal receiving the inverted output of Flip-Flop (C), an input terminal receiving the clock signal (CLK2) and an output terminal connected to the input terminal of the Flip-Flop (F2). When the output of Flip-Flop (C) is "1," the transmission gate (U1') is in a conducting state. The clock signal (CLK2) is fed to the input terminal of Flip-Flop (F2). When the output of Flip-Flop (C) is "0," the transmission gate (U1') is in a high impedance state. The operation of CMOS transmission gates (U2'-U5') is substantially similar to that of CMOS transmission gate (U1') and will not be detailed further.

5.b. Regardless of the outputs of the Flip-Flops (C-F), if the output of Flip-Flop (G) is "1," the transmission gate (U5') is in a conducting state, and the transmission gate (U5) is in a high impedance state. The input (S3) to Flip-Flop (R) is the clock signal (CLK2) [Clock signal (CLK2)=32,768 Hz].

5.c. Regardless of the outputs of the Flip-Flops (C-E), if the output of Flip-Flop (G) is "0" and the output of Flip-Flop (F) is "1," the transmission gates (U4', U5) are in a conducting state and the transmission gates (U4, U5') are in a high impedance state. The clock signal (CLK2) is fed by the transmission gate (U4') to the Flip-Flop (F5). The output frequency of Flip-Flop (F5) is one-half of the clock signal (CLK2) (16,384 Hz). The output of Flip-Flop (F5) is then fed by the transmission fate (U5) to the input terminal of Flip-Flop (R).

5.d. Regardless of the outputs of the Flip-Flops (C, D), if the outputs of Flip-Flops (F, G) are "0" and the output of Flip-Flop (E) is "1," the transmission gates (U3', U4, U5) are in a conducting state and the transmission gates (U3, U4', U5') are in a high impedance state. The frequency of the clock signal (CLK2) is divided by a factor of four by the Flip-Flops (F4, F5). The output of Flip-Flop (F5) (8,192 Hz) is then fed to the input terminal of Flip-Flop (R).

5.e. Regardless of the output of the Flip-Flop (C), if the outputs of Flip-Flops (E-G) are "0" and the output of Flip-Flop (D) is "1," the transmission gates (U2', U3-U5) are in a conducting state and the transmission gates (U2, U3'-U5') are in a high impedance state. The frequency of the clock signal (CLK2) is divided by a factor of eight by the Flip-Flops (F3-F5). The output of Flip-Flop (F5) (4,096 Hz) is then fed to the input terminal of Flip-Flop (R).

5.f. If the outputs of Flip-Flops (D-G) are "0" and the output of Flip-Flop (C) is "1," the transmission gates (U1', U2-U5) are in a conducting state and the transmission gates (U1, U2'-U5') are in a high impedance state. The frequency of the clock signal (CLK2) is divided by a factor of sixteen by the Flip-Flops (F2-F5). The output of Flip-Flop (F5) (2,048 Hz) is then fed to the input terminal of Flip-Flop (R).

5.g. If the outputs of Flip-Flops (C-G) are "0," the transmission gates (U1-U5) are in a conducting state and the transmission gates (U1'-U5') are in a high impedance state. The frequency of the clock signal (CLK2) is divided by a factor of thirty-two by the Flip-Flops (F1-F5). The output of Flip-Flop (F5) (1,024 Hz) is then fed to the input terminal of Flip-Flop (R).

6. The function of the circuit constituted by the Flip-Flop (R), AND gate (S) and NOR gate (T) is to detect a positive pulse signal having a pulse width of 15 microseconds. The output of the AND gate (S) is then fed to a series of inverters so as to generate the output signals (S1, S2).

The characterizing features of the present invention are as follows:

1. A noise-suppressing sampling circuit, which utilizes digital logic gates, is used to distinguish noise signals from movement signals. Untimely movement of the cursor on the computer display screen is thus minimized.

2. The timing control circuit (1) monitors the frequency of the XCLK and YCLK signals so as to adjust the sampling frequency and the rate of actuation of the switch gate (2) in order to correspond with the speed of the movement of the pointing device.

3. The movement sensor means is intermittently connected to the electric power source by means of a switch gate (2) which is actuated by a train of pulse signals. The rate of actuation of the switch gate (2) corresponds to the speed of movement of the pointing device.

While the present invention has been described in connection with what is considered the most practical and preferred embodiment, it is understood that this invention is not limited to the disclosed embodiment, but is intended to cover various arrangements included within the spirit and scope of the broadest interpretation so as to encompass all such modifications and equivalent arrangements.

We claim:

1. An electric circuit for a pointing device comprising:
   a movable part;
   means for generating a movement signal corresponding to a movement of said movable part;
   means for sampling said movement signal;
   means for distinguishing said movement signal from a noise signal;
   said means for distinguishing including means for generating a displacement signal only during a non-occurrence of said noise signal during an occurrence of said movement signal;
   means for producing a first signal and a second signal based on said displacement signal;
   means, responsive to said first signal, for intermittently and variably connecting a voltage to said mans for generating; and
   said means for sampling including means for controlling a sampling action based on said second signal.

2. An electric circuit as claimed in claim 1, wherein said means for sampling performs said sampling action at an end of said first signal.

3. A pointing device comprising:
   a movable part;
   means for generating a movement signal responsive to a movement of said movable part;
   means for sampling said movement signal to produce a sampled signal;
   means for producing a direction signal and a displacement signal, responsive to said sampled signal;
   means for controlling said means for generating and means for sampling, responsive to said displacement signal; and
   said means for controlling including means for intermittently and variably connecting a voltage to said means for generating.

4. A pointing device as claimed in claim 3, further comprising an electric power source producing said voltage.

5. A pointing device as claimed in claim 3, wherein said means for controlling includes means for generating a control signal.

6. A pointing device as claimed in claim 5, wherein:
   said means for controlling includes a switch; and
   said switch, responsive to said control signal, connects said voltage to said means for generating.

7. A pointing device as claimed in claim 5, wherein said means for sampling includes means for performing a sampling action at an end of said control signal.

* * * * *